US006760032B1

(12) United States Patent
James (10) Patent No.: US 6,760,032 B1
(45) Date of Patent: Jul. 6, 2004

(54) HARDWARE-IMPLEMENTED CELLULAR AUTOMATA SYSTEM AND METHOD

(75) Inventor: Gregory E. James, Redwood City, CA (US)

(73) Assignee: Nvidia Corporation, Santa Clara, CA (US)

( * ) Notice: Subject to any disclaimer, the term of this patent is extended or adjusted under 35 U.S.C. 154(b) by 287 days.

(21) Appl. No.: 10/098,833

(22) Filed: Mar. 14, 2002

(51) Int. Cl.[7] .............................................. G06T 1/20
(52) U.S. Cl. ..................... 345/506; 345/582; 345/601; 345/552; 345/522; 345/556
(58) Field of Search ................................ 345/582–586, 345/601, 503, 506, 522, 545, 552, 556

(56) References Cited

U.S. PATENT DOCUMENTS

| | | | | |
|---|---|---|---|---|
| 6,456,744 B1 | * | 9/2002 | Lafe ............................ | 382/248 |
| 6,654,021 B2 | * | 11/2003 | Wasserman et al. ......... | 345/535 |
| 2003/0115021 A1 | * | 6/2003 | Mates ......................... | 702/186 |

OTHER PUBLICATIONS

Iwasaki, K., Dobashi, Y., Nishita, T. Efficient Rendering of Optical Effects within Water Using Graphics Hardware. Ninth Pacific Conference on Computer Graphics and Applications, pp 374–383 (2001).*
Nishita, T., Dobashi, Y. Modeling and rendering of various natural phenomena consisting of particles. Computer Graphics International, pp 149–156 (2001).*
Peercy, M., Olano, M., Airey, J., Ungar, J. Interactive Multi-Pass Programmable Shading. SIGGRAPH 2000, pp 425–432 (2000).*
Sarkar, P.A Brief History of Cellular Automat. ACM Computing Surveys, vol. 32, No. 1, Mar. 2000.*
Dobashi, Y., Kaneda K., Yamashita, H., Okita, T., and Nishita, T. A Simple, Efficient Method for Realistic Animation of Clouds. SIGGRAPH 2000, pp 19–28 (2000).*
Harris, M., Coombe, G., Scheuermann, T., and Lastra, A. Physically-Based Visual Simulation on Graphics Hardware. The Eurographics Association, 2002, pp 1–10.*
Fleischer, K., Laidlaw, D., Currin, B., Barr, A. Cellular Texture Generation. Proceedings of the 22nd Annual Conference on Computer Graphics and Interactive Techniques, vol 16, issue 2, pp 239–248 (1995).*
Heidrich, W., Westermann, R., Seidel, H., Ertl, T. Applications of Pixel Textures in Visualization and Realistic Image Synthesis. 1999 Symposium on Interactive 3D Graphics, pp 127–134 (1999).*
DeLoura, Mark A. "Gaming Programming Gems", Charles River Media, Inc. Rockland, Massachusetts, 2000.

* cited by examiner

Primary Examiner—Ulka J. Chauhan
(74) Attorney, Agent, or Firm—Silicon Valley IP Group, PC; Kevin J. Zilka (57) ABSTRACT

A system and method are provided for executing a cellular automata program in a hardware graphics pipeline. Initially, cell values are received in a hardware graphics pipeline. Next, the cell values are rendered to generate a condition value utilizing the hardware graphics pipeline. A cell value result for the subsequent generation is read from a rule map according to the condition value utilizing the hardware graphics pipeline. Still yet, additional cell values are stored based on the rule map value.

26 Claims, 10 Drawing Sheets

|  | 0 | 1 | 2 | 3 | 4 | 5 | 6 | 7 | 8 |
|---|---|---|---|---|---|---|---|---|---|
| ON |  |  |  | X |  |  |  |  |  |
| OFF |  |  | X | X |  |  |  |  |  |

Initial Generation · Next Generation

HARDWARE-IMPLEMENTED CELLULAR AUTOMATA SYSTEM AND METHOD

FIELD OF THE INVENTION

The present invention relates to computer graphics, and more particularly to cellular automata application programs in the context of computer graphics.

BACKGROUND OF THE INVENTION

A cellular automata program, or simply a "cellular automata," is a program in which a set of rules is applied to a discreet array or grid of values in order to create a new value at each point in the grid. Each grid value is a "cell" and the state of the grid constitutes one "generation" of the field of cells. In applying the rules to a generation, a new generation of cells is created. The rules are then applied to the new generation to create yet another, and so forth.

Typically, the rules are local to each cell of the grid, meaning they involve only the cells surrounding each individual cell. One example of such a rule includes: "turn a cell on if it has exactly three neighbors that are also turned on" and "turn a cell off if it has more than three neighbors turned on." This simplifies the creation of each new generation, as only a small area of the previous generation determines the state of each new cell.

Cellular automata programs are typically run on a 2-dimensional (2D) grid, but can also be specified in n-dimensions. The programs produce useful and interesting patterns as they evolve over time. In the context of computer graphics, the patterns are useful in rendering animated effects and for generating features procedurally.

An example of the foregoing principles will now be set forth in the context of computer graphics. Such example involves combining neighbor sampling and dependent look-ups to run Conway's popular "Game of Life" cellular automata programming in a graphics pipeline. For more information on such program reference may be made to: Gardner, Martin, "Mathematical Games," *Scientific American*, vol. 223, no. 4, Octobre 1970, pp. 120–123; which is incorporated herein by reference in its entirety. While the present example involves Conway's cellular automata formulation, modifications may be applied to run significantly more complex cellular automata programs.

In Conway's "Game of Life," each cell begins as either "on" or "off" which is represented by a grid of white or black texels, respectively. The rules for creating the next generation for every cell on the map are shown in Table #1.

TABLE 1

1) If a cell is on and has two or three neighbors on, the cell remains on in the next generation.
2) If a cell is on and has fewer than two or greater than three neighbors on, the cell is turned off in the next generation.
3) If a cell is off and has three neighbors on, the cell is turned on in the next generation.

The game requires that for each cell, the eight cell neighbors and the cell itself be sampled, and logic be applied to the result of the sampling. More information on an exemplary technique for running the game using a hardware stencil buffer may be found with reference to: Neider, Jackie, et. al., *OpenGL Programming Guide*, Addison-Wesley Publishing Co., 1993.

Figure 1:
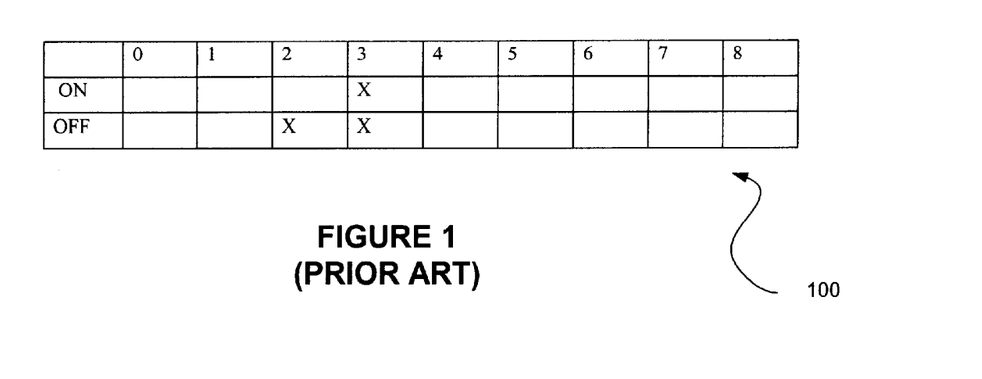
FIGS. 1–3 illustrate the prior art.

Prior Art FIG. 1 illustrates an exemplary rule table 100 that may be used by a cellular automata program. As shown, the rule table 100 embodies the rules of Table #1, and may be used to carry out the foregoing logic necessary for creation of the next generation of cells. The rule table 100 is accessed for each cell at a horizontal coordinate according to the number from zero to eight of neighbors which are "on" and in the vertical coordinate according to whether the cell is "on" or "off." The table yields an "X" for all cells conditions that should result in an "on" cell in the next generation and is blank for all cell conditions that should result in a "off" cell.

Figure 2:
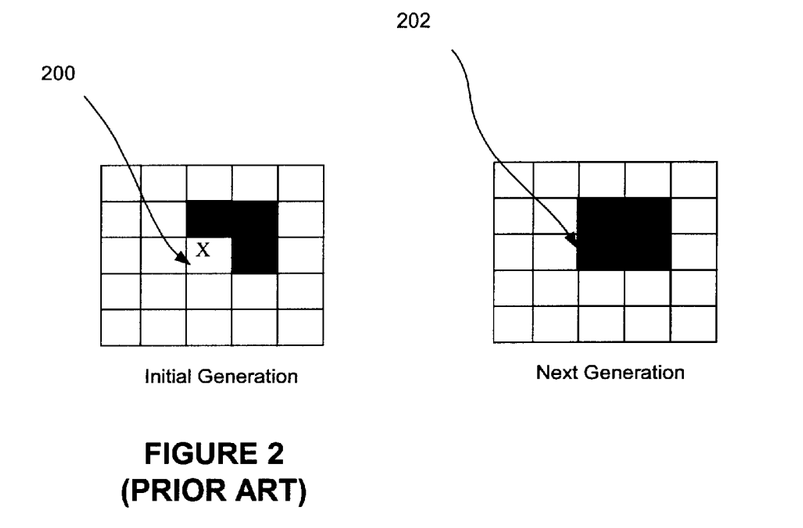
Figure 3:
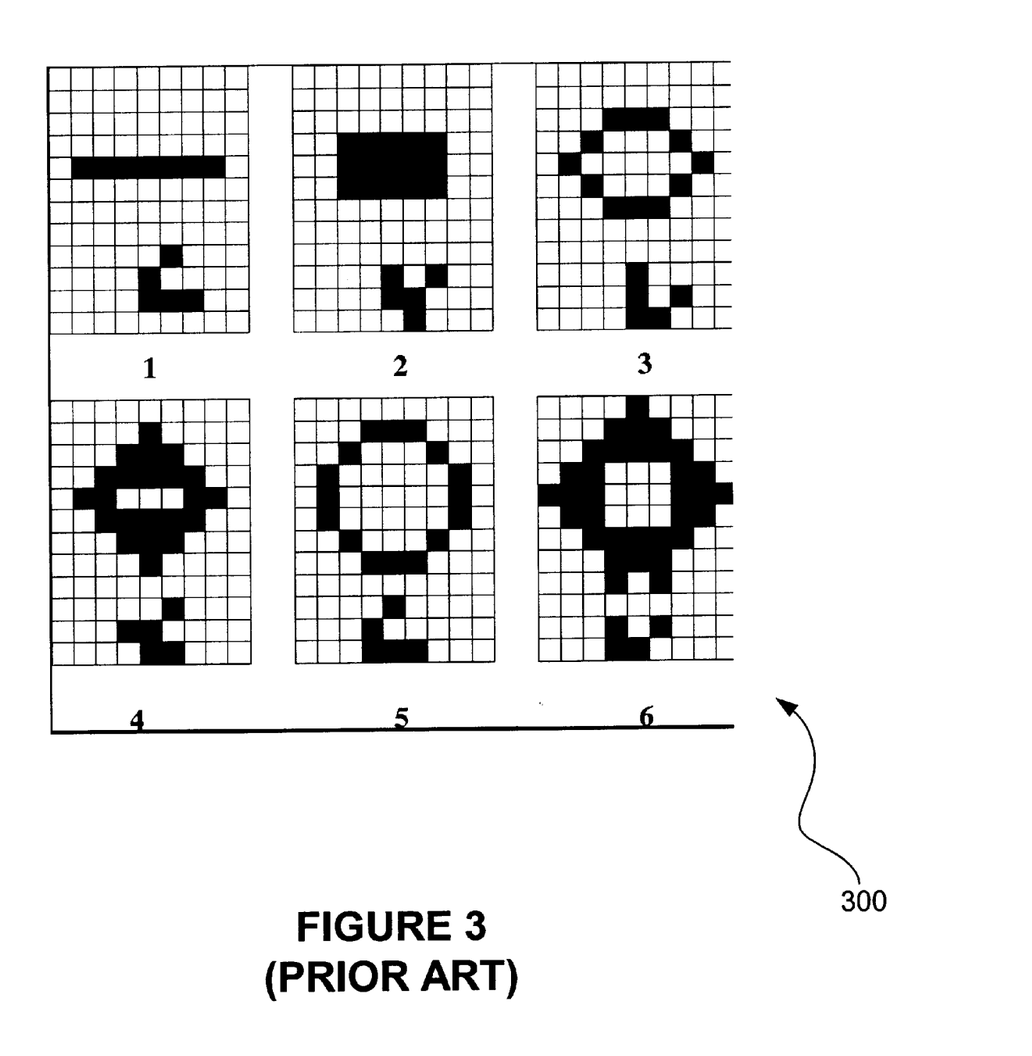

Prior Art FIG. 2 illustrates an example of how a first cell state 200 may be translated into a second cell state 202 based on the logic embodied in the rule map 100 of FIG. 1. Prior Art FIG. 3 shows a more intricate example 300 of how a cellular automata program may operate based on the logic embodied in the rule map 100 of FIG. 1 and yield various patterns over six generations of cells. Application of the rules to each numbered generation results in the subsequent numbered generation.

As mentioned earlier, the foregoing patterns are useful in the context of computer graphics rendering. Traditionally, such cellular automata programs have been implemented on general central processing unit (CPU) architectures utilizing software and a system-to-video card bus or in a limited and inflexible manner using a hardware stencil buffer. Such systems are typically limited in speed and bandwidth. There is thus a need for the ability to run such programs efficiently on a hardware graphics pipeline, avoid a transfer of data across a system-to-graphics pipeline bus, and establish a technique by which the rules that govern the cellular automata may be easily changed.

DISCLOSURE OF THE INVENTION

A system and method are provided for executing a cellular automata program in a hardware graphics pipeline. Initially, cell values are received in a hardware graphics pipeline. Next, the cell values are rendered to generate a condition value utilizing the hardware graphics pipeline. A cell value result for the subsequent generation is read from a rule map according to the condition value utilizing the hardware graphics pipeline. Still yet, additional cell values are stored based on the rule map value.

In one embodiment, the cell values may be referenced by geometry. As an option, the cell values may be referenced as an array of textures.

In another embodiment, a plurality of the cell values may be combined. Further, the combined cell values may be rendered to generate the condition value. Optionally, at least one of the combined cell values may include a cell value from a previous iteration of the receiving, rendering, and reading operations.

In still another embodiment, the condition value may be represented by a color value. In use, a plurality of the condition values may be combined. Moreover, the rule map value may be read from the rule map with the combined condition values.

In still yet another embodiment, the rule map may be 1-dimensional, 2-dimensional, 3-dimensional, 4-dimensional, etc. Further, the rule map may be a look-up table. In use, the rule map value may be read from the rule map utilizing the condition value as an index into the rule map. Optionally, the rule map value may be programmably read from the rule map.

As an option, a plurality of rule map values may be read from a plurality of rule maps. Further, the receiving, rendering, and reading operations may be repeated in multiple iterations utilizing the rule map value from a previous iteration.

In still another embodiment, the receiving, rendering, and reading operations may be repeated in multiple iterations. Such operations may further be programmably repeated. Such programmability may be applied to any desired aspect of the present embodiment.

In another embodiment, the geometry referencing the cell values may be bound to the rule map. Further, the geometry may be bound to information indicating how to access a plurality of the cell values as a texture lookup. While any desired architecture may be used in the context of the present embodiment, the various operations may be executed in a multi-texture engine of the hardware graphics pipeline.

Optionally, the cell values may be written to the rule map itself in the hardware graphics pipeline, thereby creating a self-modifying cellular automata program.

These and other advantages of the present invention will become apparent upon reading the following detailed description and studying the various figures of the drawings.

BRIEF DESCRIPTION OF THE DRAWINGS

The foregoing and other aspects and advantages are better understood from the following detailed description of a preferred embodiment of the invention with reference to the drawings, in which.

DESCRIPTION OF THE PREFERRED EMBODIMENTS

Figure 4:
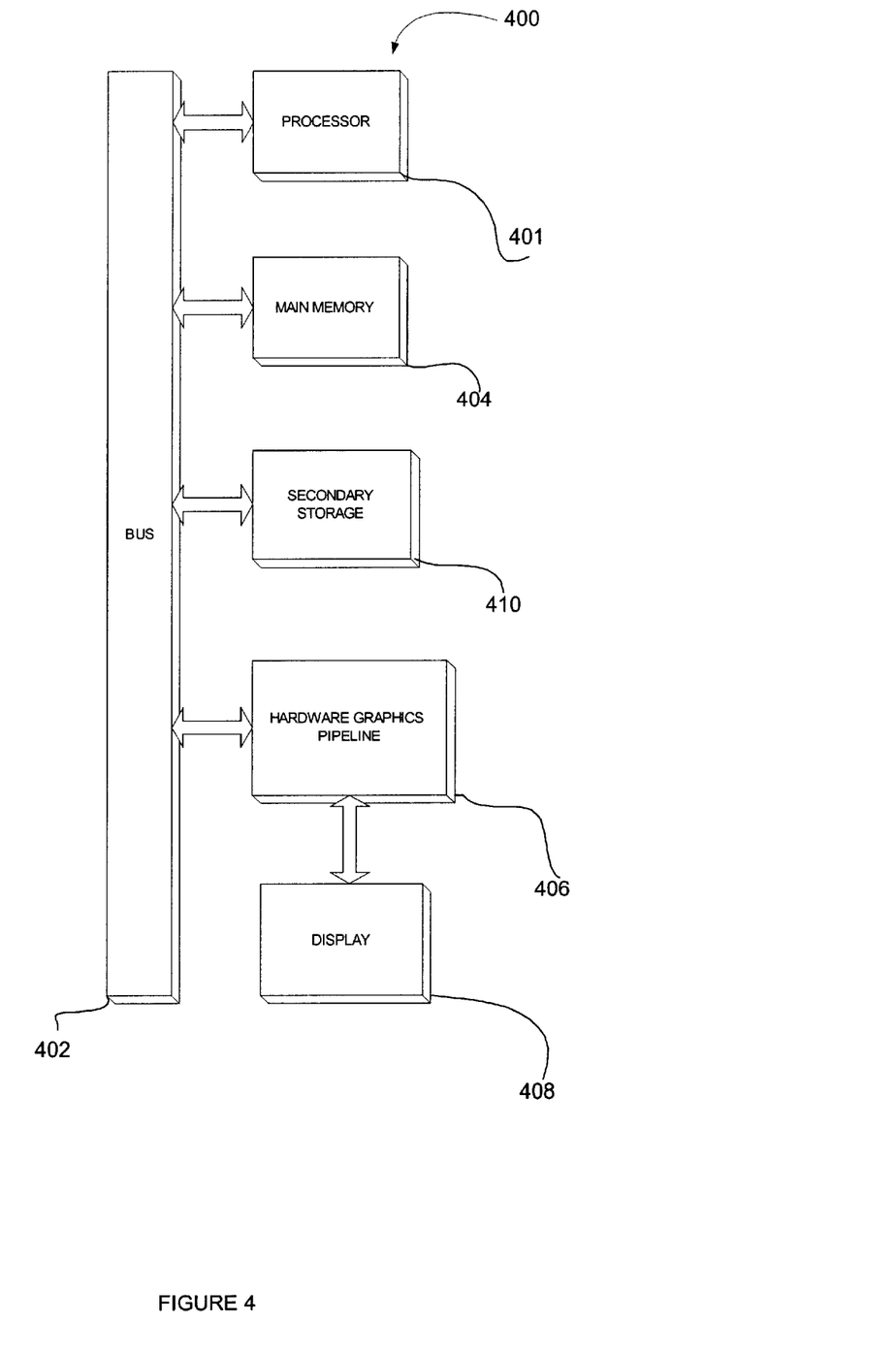
FIG. 4 is a block diagram of a digital processing system embodying a method and apparatus in accordance with one embodiment.

FIGS. 1–3 illustrate the prior art. FIG. 4 is a block diagram of a digital processing system embodying the method and apparatus in accordance with one embodiment. With reference to FIG. 4, a computer graphics system is provided that may be implemented using a computer 400. The computer 400 includes one or more processors, such as processor 401, which is connected to a communication bus 402. The computer 400 also includes a main memory 404. Control logic (software) and data are stored in the main memory 404 which may take the form of random access memory (RAM). The computer also includes a hardware graphics pipeline 406 and a display 408, i.e. a computer monitor.

The computer 400 may also include a secondary storage 410. The secondary storage 410 includes, for example, a hard disk drive and/or a removable storage drive, representing a floppy disk drive, a magnetic tape drive, a compact disk drive, etc. Computer programs, or computer control logic algorithms, are stored in the main memory 404 and/or the secondary storage 410. Such computer programs, when executed, enable the computer 400 to perform various functions. Memory 404 and storage 410 are thus examples of computer-readable media.

In one embodiment, the techniques to be set forth are performed by the hardware graphics pipeline 406 which may take the form of any type of hardware. Such hardware implementation may include a micro-controller or any other type of application specific integrated circuit (ASIC). More information on one exemplary embodiment of the hardware graphics pipeline 406 will be set forth in greater detail during reference to FIG. 5. The configuration of the graphics pipeline and general control over rendering operations is provided by the processor 401 which may also prepare appropriate geometry and basis values.

Figure 5:
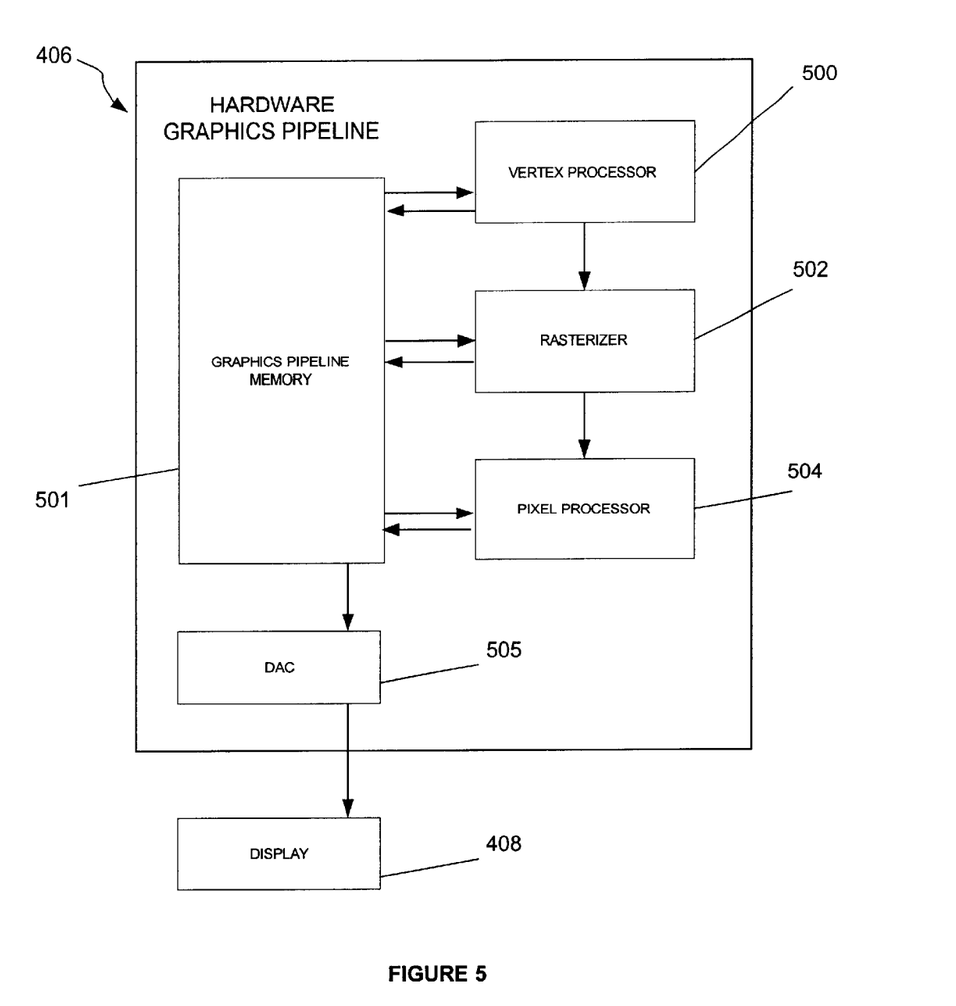
FIG. 5 illustrates the hardware graphics pipeline of FIG. 4, in accordance with one embodiment.

FIG. 5 illustrates the hardware graphics pipeline 406 of FIG. 4, in accordance with one embodiment. As shown, the hardware graphics pipeline 406 may include a vertex processor portion 500 capable of performing various operations (i.e. transformation, lighting, etc.) on graphics data in the form of vertices in the hardware graphics pipeline 406. Further included is a rasterizer 502 coupled to the vertex processor portion 500 for receiving the processed vertices therefrom. Such vertices define primitives. In the context of the present description, primitives may include, but are not limited to planar polygons. Alternate graphics primitives, for alternate embodiments, include: points, lines, quadratic patches, constructive solid geometry surfaces, and other higher order primitives. In use, the rasterizer 502 converts the primitives to fragments that correspond to a pixel in a frame buffer render target. Further, a digital-to-analog converter (DAC) 505 and pipeline memory 501 may be incorporated in a well known manner.

Once rasterized, the fragments are processed by a pixel processor portion 504 which is coupled to the rasterizer 502. Despite the term "pixel processor" 504, it should be noted that such portion processes texture fragments and/or pixels. Such processing may include, but is not limited to texturing, shading, texture coordinate perturbation, etc. More information on one exemplary embodiment of the pixel processor portion 504 will be set forth in greater detail during reference to FIG. 5A.

Of course, any of the foregoing components of the hardware graphics pipeline 406 may or may not be configurable in any desired fashion. Further, the various techniques to be described herein may be implemented in any one or more of the components of the hardware graphics pipeline 406, per the desires of the user.

Figure 5A:
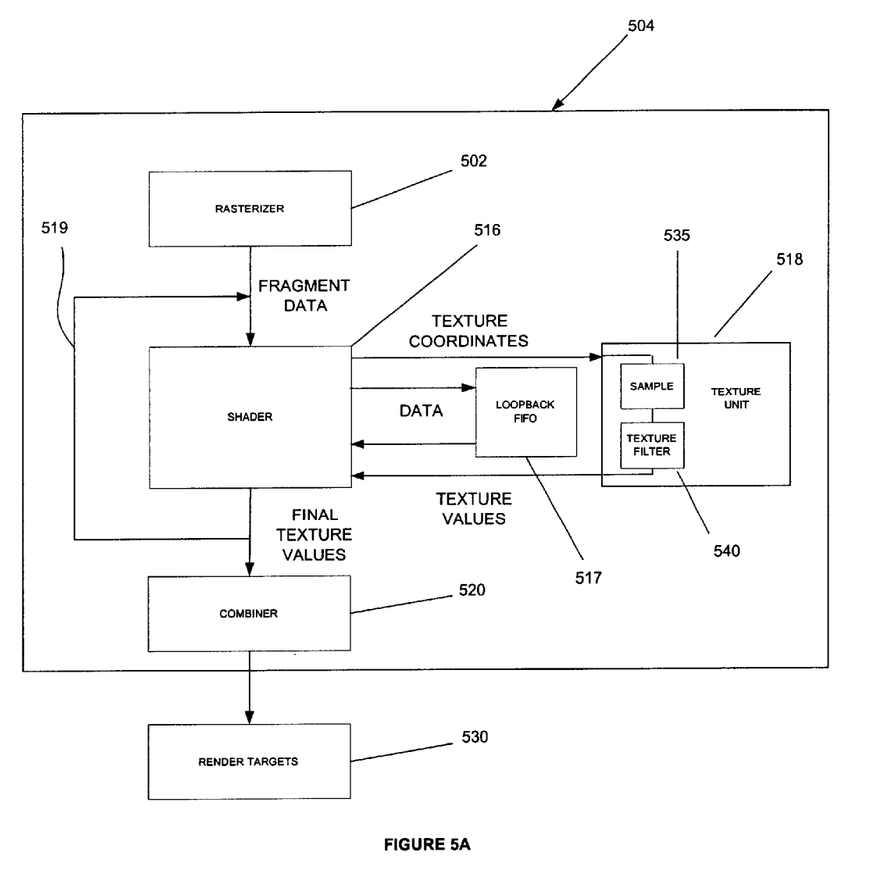
FIG. 5A shows an illustrative hardware implementation of the pixel processor portion of the hardware graphics pipeline of FIG. 4, in accordance with one exemplary embodiment.

FIG. 5A shows an illustrative hardware implementation of the pixel processor portion 504, in accordance with one exemplary embodiment. As shown, included is a shader module 516 coupled to the rasterizer 502, a texture fetch module 518, and a combiner 525 coupled to form a portion of the hardware graphics pipeline 406. For reasons that will soon become apparent, a feedback loop 519 is coupled between an output of the shader module 516 and an input thereof. It should be noted that the rasterizer 502 operates in a manner as set forth during reference to FIG. 5. While the combiner 525 may be implemented in any desired manner, one exemplary implementation is disclosed in a co-pending application entitled "Graphics Pipeline Including Combiner Stages" naming David B. Kirk, Matthew Papakipos, Shaun Ho, Walter Donovan, and Curtis Priem as inventors and issued under U.S. Pat. No.: 6,333,744, and which is incorporated herein by reference in its entirety.

With continuing reference to FIG. 5A, the various inputs and outputs are shown for each of the components. The rasterizer 502 generates fragment data (i.e. interpolated vertex data, edge distances, pixel depth) which are used by the shader module 516 and texture fetch module 518. Also shown is an optional feedback first-in first-out (FIFO) buffer. When the feedback loop 519 is not utilized, the temporary data calculated internally by the present embodiment may be dropped before being sent to the texture fetch module 518. As an option, data may be reused each time a particular group of pixels, or "quad," goes through the shader module 516. If, for example, new vectors are generated during one pass, these vectors may continuously be associated with the quad on subsequent passes. Further, more than one fragment may be processed at a time while employing the feedback loop 519.

Figure 6:
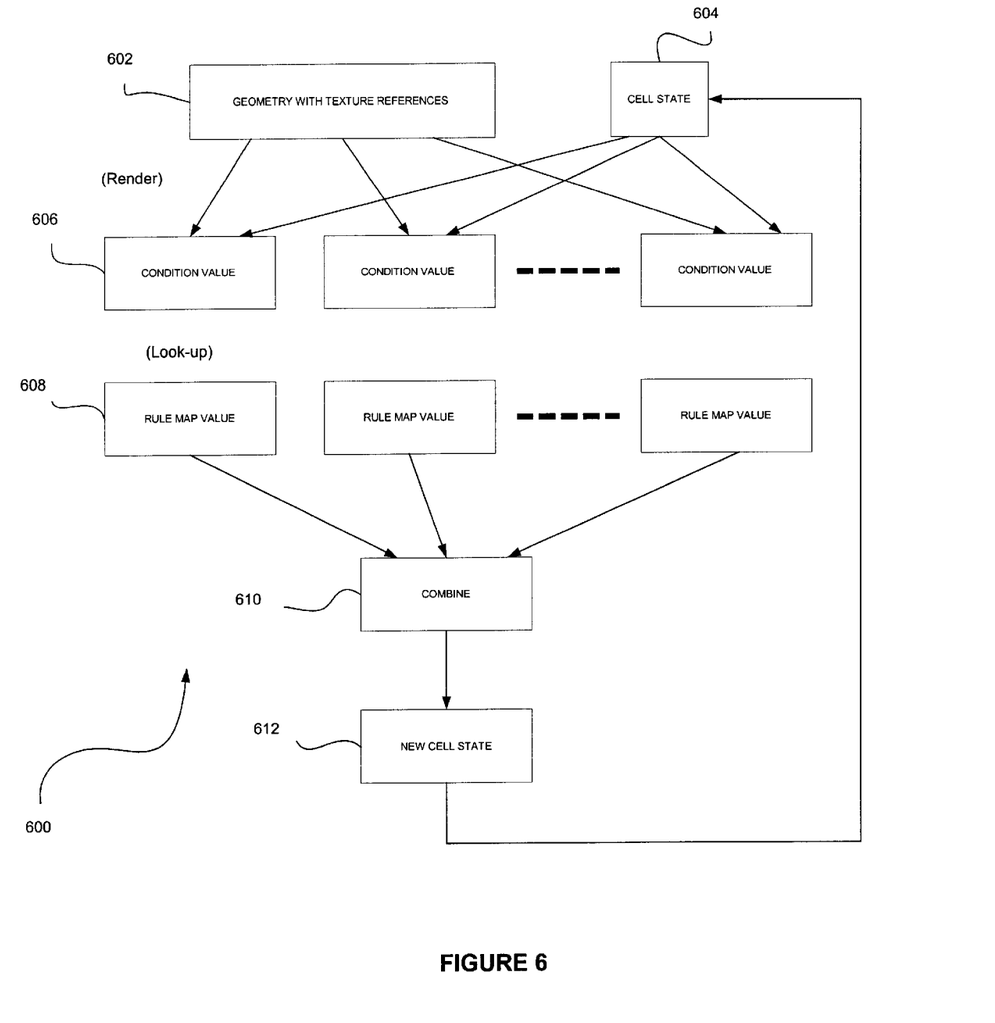
FIG. 6 illustrates a cellular automata framework, in accordance with one embodiment.

FIG. 6 illustrates a cellular automata framework 600, in accordance with one embodiment. It should be noted that the present framework 600 may be implemented in the context of the hardware graphics pipeline of FIGS. 4–5A. Of course, the cellular automata framework 600 may be carried out in any desired hardware graphics pipeline.

As shown in FIG. 6, geometry 602 with texture references is provided. Such geometry 602 may include any object (i.e. point, line, triangle, etc.) to be rendered, and the texture references may refer to a specific array of texture values associated with such geometry 602.

In use, the geometry 602 with texture references is representative of cell values. In the context of the present description, such cell values may refer to any graphics information (i.e. lighting, color, texture, etc.) corresponding to a portion of an image or object (pixel, fragment, vertex, etc.) to be rendered. While the cell values are represented by geometry 602 with texture references in the present embodiment, it should be noted that cell values may be represented in any desired fashion.

Also provided in the present framework 600 is a current cell state 604. Such current cell state 604 is indicative of a current state of the cell values that were previously represented by the geometry 602. In other words, the current cell state 604 represents the current cell values resulting from a previous iteration(s) of the present framework 600. Such current state of the cell values may be used to determine a future state of the cell values, in a manner that will soon become apparent.

Based on a rendering operation, one or more condition values 606 are generated based on one or more of the cell values represented by the geometry 602 and/or the stored cell state 604. As an option, a plurality of the cell values may be combined, and the combined cell values may be rendered to generate one or more of the condition values 606. In one embodiment, these condition values 606 may include a vector of one or more dimensions in the form of color values. In general, the condition values may refer to any entities that describe each cell in relation to a rule map that will be soon be described.

Next, a look-up operation involving one or more rule maps is performed utilizing one or more of the condition values 606 in order to generate one or more of rule map values 608. As an option, a plurality of the condition values 606 may be combined, and the rule map values 608 may be read from the rule map(s) with the combined condition values 606. Further, the rule map values 608 are combined 610 before updating the state of the cells with a new cell state 612.

It should be noted that the rule map(s) may include a 1-dimensional, 2-dimensional, 3-dimensional, 4-dimensional, etc. look-up table. In the context of the present description, the rule map values 608 may refer to any values representing or capable of being used to generate an updated state of cell values. In one embodiment, the rule map(s) may include texture map(s).

With the new cell state 612 generated, multiple iterations may be programmably carried out utilizing information from previous iterations in the cellular automata framework 600 in the hardware graphics pipeline to generate any desired resultant patterns. As will now become apparent during reference to FIGS. 7–9, the present framework 600 may take on numerous variations when implemented.

Figure 7:
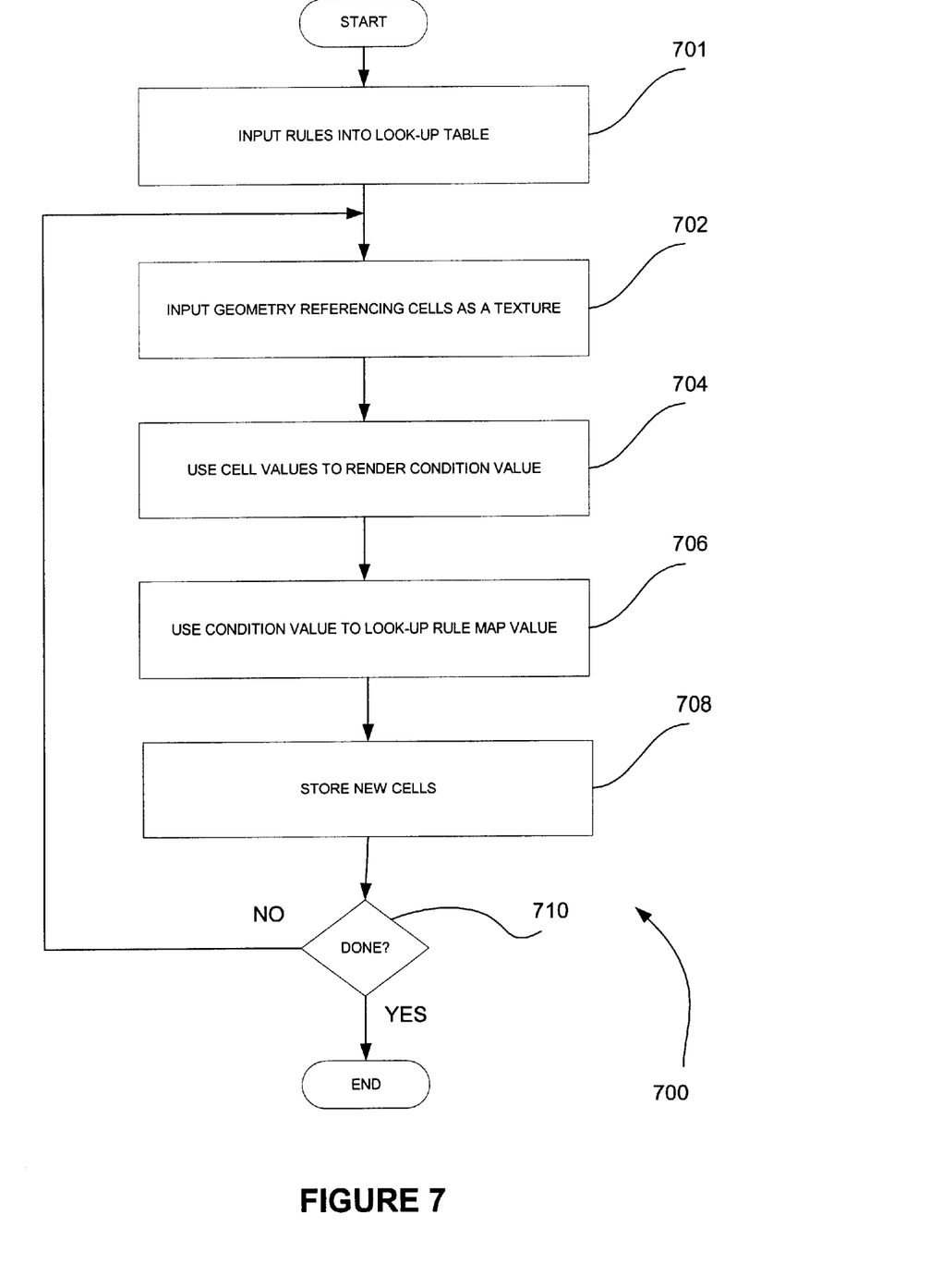
FIG. 7 illustrates a method for executing a cellular automata program in a hardware graphics pipeline using the framework of FIG. 6, in accordance with one embodiment.

FIG. 7 illustrates a method 700 for executing a cellular automata program in a hardware graphics pipeline using the framework 600 of FIG. 6, in accordance with one embodiment. While the present method 700 is described in the context of the framework 600 of FIG. 6, it should be noted that the present method 700 may be executed using any desired framework.

Initially, in operation 701, a rule map is input in a look-up table in a hardware graphics pipeline. In the context of the present description, the rule map may refer to any type of logic, look-up table, etc. capable of generating a rule map value based on a condition value. In the context of an embodiment where the rule map includes a look-up table, one or more rule map values may be read from the rule map utilizing one or more condition value as an address index into the rule map.

Next, geometry that references cell values as an array of textures is input in the hardware graphics pipeline, as set forth in operation 702. Such geometry is pre-"bound" to the rule map and information indicating how to access a plurality of the cell values as a texture lookup. This binding may include any type of link to a program or the like that identifies the associated rule map, and provides specific instructions as to how to access the cell values associated with the geometry as a texture lookup.

In operation 704, the cell values are rendered to generate a condition value utilizing the hardware graphics pipeline. As mentioned earlier, the condition value may be represented by a color value. Next, in operation 706, the condition value is used to look-up at least one rule map value. This rule map value represents the new state of the cell values. These new cell values may be stored in operation 708. At this point, it may be determined whether the present method 700 is complete in decision 710. The foregoing operations may then be iterated, based on the decision 710.

Figure 8:
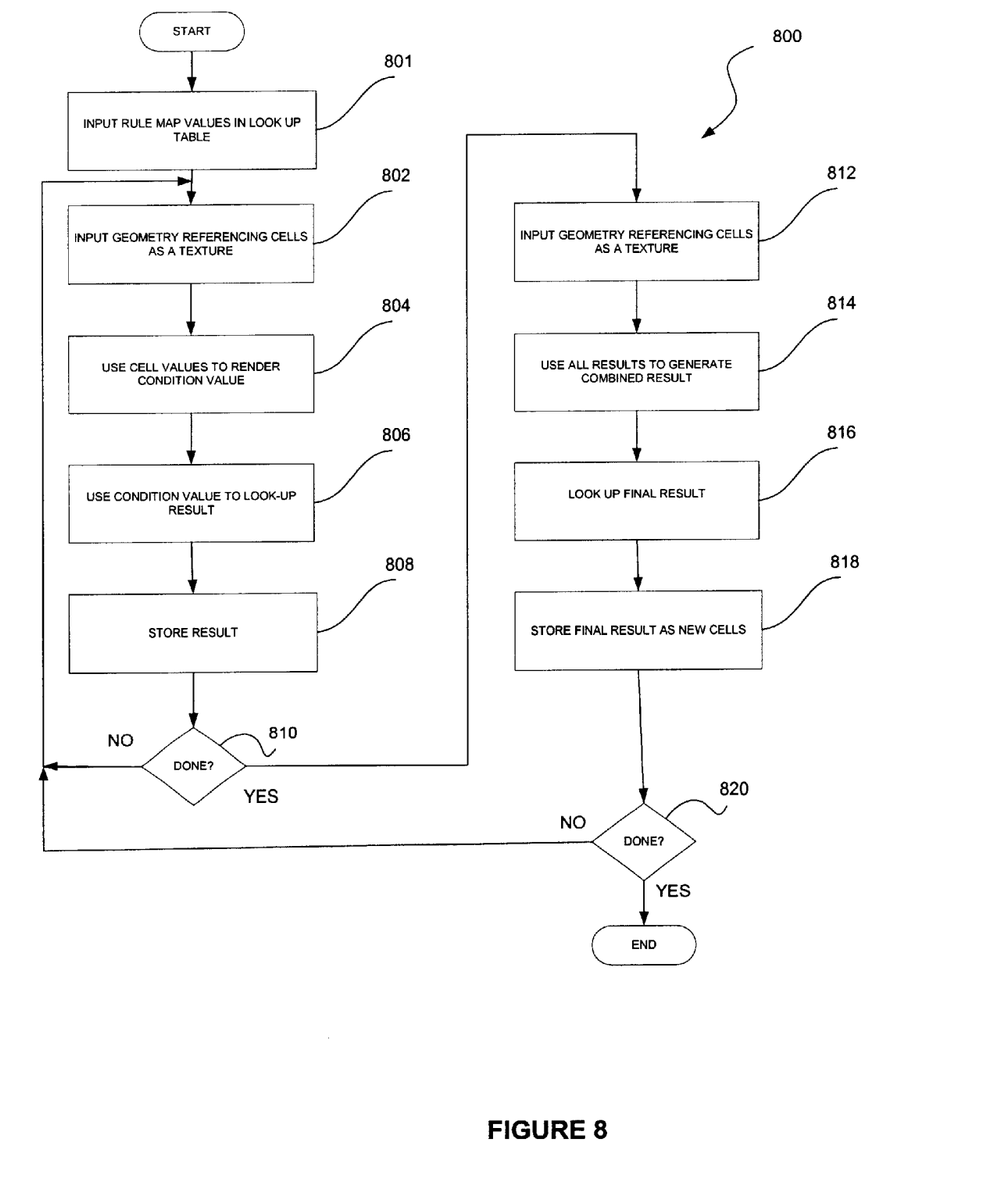
FIG. 8 illustrates another method for executing a cellular automata program in a hardware graphics pipeline using the framework of FIG. 6, in accordance with another embodiment.

FIG. 8 illustrates another method 800 for executing a cellular automata program in a hardware graphics pipeline using the framework 600 of FIG. 6, in accordance with another embodiment. Again, the present method 800 is described in the context of the framework 600 of FIG. 6. It should be noted that the present method 800 may be executed in any desired framework.

Initially, various operations similar to those of the method 700 of FIG. 7 are carried out. In particular, in operation 801, a rule map is input in a look-up table in a hardware graphics pipeline. Next, geometry that references cell values as an array of textures is input in the hardware graphics pipeline, as set forth in operation 802. In operation 804, the cell values are rendered to generate a condition value utilizing the hardware graphics pipeline. Next, in operation 806, the condition value is used to look-up at least one rule map value which represents the new state of the cell values. These new cell values may be stored in the form of a result in operation 808. At this point, it may be determined whether the present method 800 is complete in decision 810. The foregoing operations may then be iterated, based on the decision 810.

If it is determined that the present method 800 is complete in decision 810, additional geometry that references cell values as an array of textures is input in the hardware graphics pipeline, as set forth in operation 812. In operation 814, the results (i.e. cell values) of the initial operations 801–808 are combined. This combined result may then be used to render a condition value which, in turn, may be used to look up at least one rule map value that provides a final resultant state of the cell values. See operation 816. This final result may then be stored in operation 818. It is then again determined whether the current method 800 is done in decision 820. If so, the current method 800 is terminated. If not, however, the process may be continued at operation 802, whereby additional geometry is inputted and processed in the foregoing manner.

Thus, in the present embodiment, the process for generating new cell value states may be repeated as desired to generate additional cell value states. Further, the resultant cell value states of one iteration may be used in a subsequent iteration, per the desires of the user.

Figure 9:
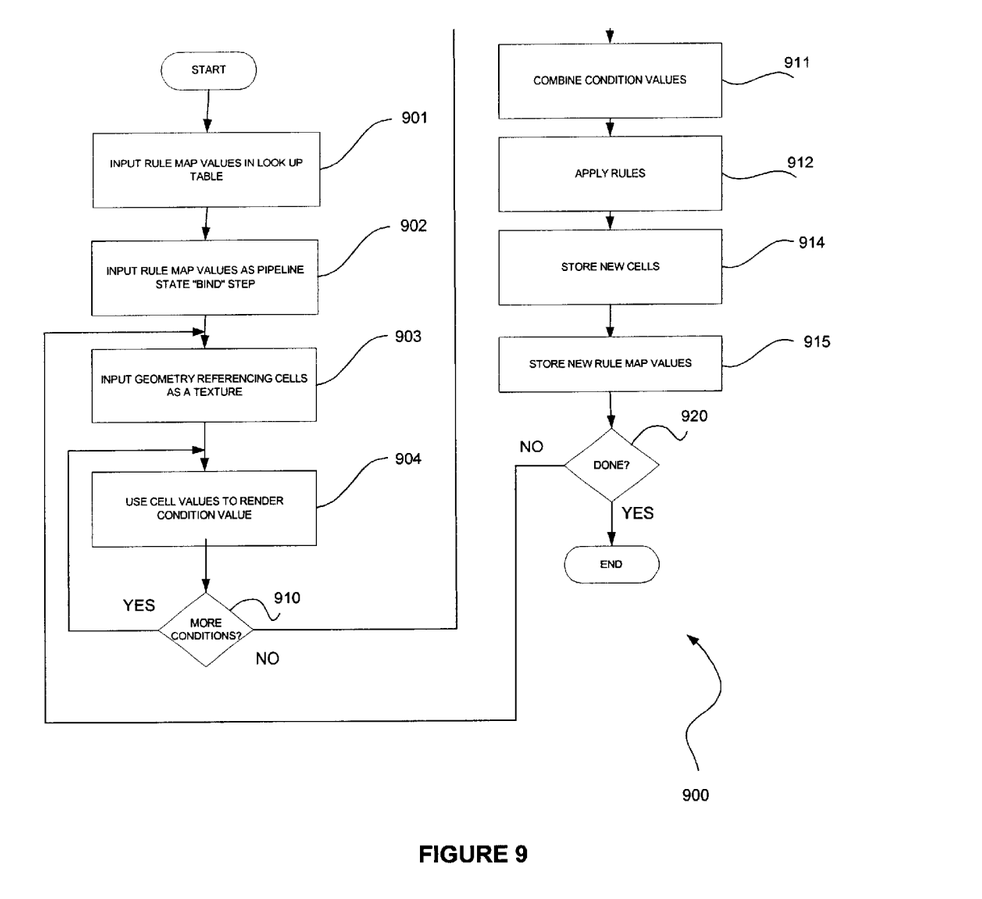
FIG. 9 illustrates yet another method for executing a cellular automata program in a hardware graphics pipeline using the framework of FIG. 6, in accordance with still another embodiment.

FIG. 9 illustrates yet another method 900 for executing a cellular automata program in a hardware graphics pipeline using the framework 600 of FIG. 6, in accordance with still another embodiment. In operation 901, a rule map is input in a look-up table in a hardware graphics pipeline.

Next, in operation 902, rule map values are input as a pipeline state "bind." As will soon become apparent, geometry is input that references multiple cell values as an array of textures. The present "binding" operation binds the geometry to the appropriate rule map and indicates how to access and combine the multiple cell values. The present binding operation may, in one embodiment, simply link the input geometry to stored data (e.g., textures) within the pipeline. In particular, this binding may link to a program inside the pipeline that indicates how to combine multiple condition values and/or multiple rule map values in any particular combination.

Next, the geometry that references cell values as an array of textures is input in the hardware graphics pipeline, as set forth in operation 903. Subsequently, the cell values are rendered to generate a condition value utilizing the hardware graphics pipeline. See operation 904.

The condition value at each cell may be used immediately or written to a texture for later use. To accomplish this, it may be determined in decision 910 whether more condition values are to be generated. Again, this determination may be made using a program identified in the binding operation 902. If more condition values are to be generated, operation 904 is repeated.

If, however, decision 910 indicates that no further condition values are to be generated, the existing condition values are combined. See operation 911. It should be noted that such combination may be carried out in any desired manner (i.e. weighted average, sum, etc.) that produces a final condition value that appropriately represents the condition values involved.

Next, in operation 912, the combined condition value is used to look-up a rule map value which represents the new state of the cell values. These new cell values may be stored in the form of a result in operation 914. Optionally, they may be written to one or more rule maps. See operation 915. At this point, it may be determined whether the present method 900 is complete in decision 920. The foregoing operations may then be iterated starting with operation 903, based on the decision 920. Thus, the present method 900 of FIG. 9 allows multiple condition values to be combined during the course of creating a new generation of a state of cell values.

It should be noted that the various features of the methods of FIGS. 7–9 may be included, excluded, combined, etc. in any desired manner. One specific example of how a hardware-implemented cellular automata program may operate will be set forth during reference to FIG. 10.

Figure 10:
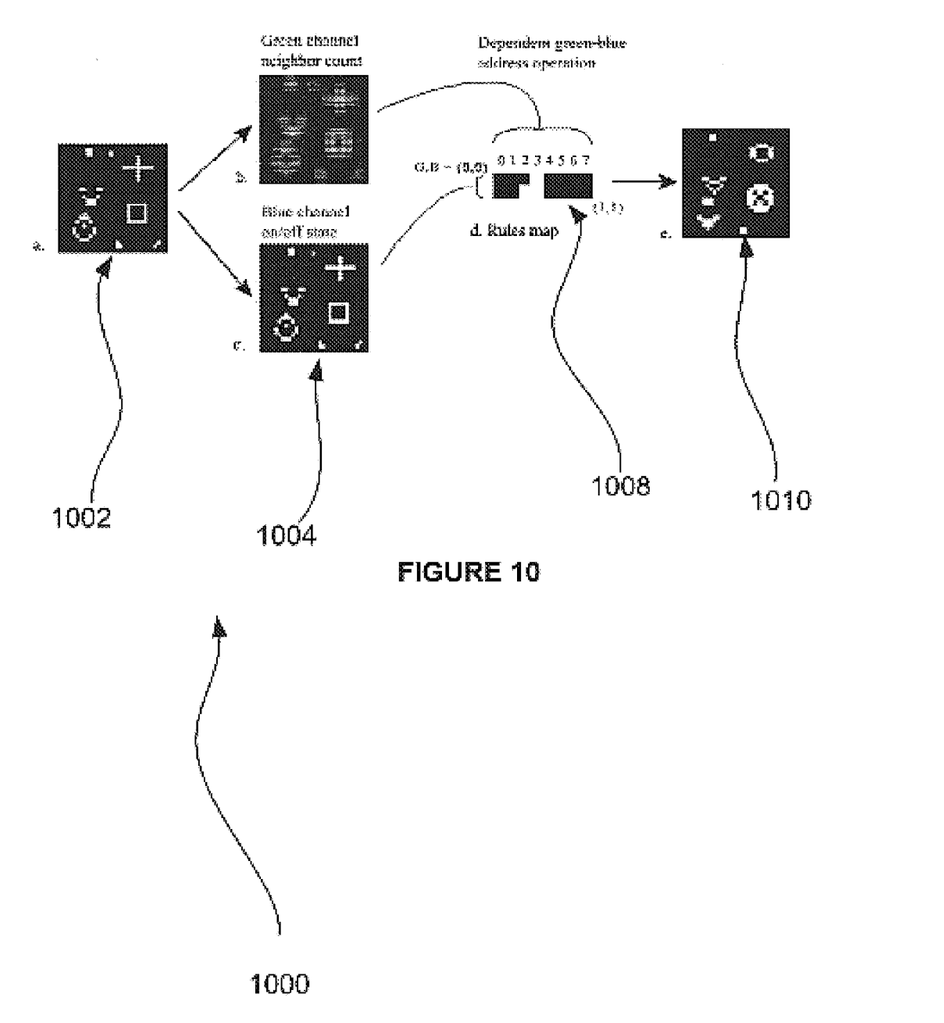
FIG. 10 illustrates a general example of a hardware-implemented cellular automata program, in accordance with one embodiment.

FIG. 10 illustrates a general example 1000 of a hardware-implemented cellular automata program, in accordance with one embodiment. As shown, an initial generation source texture 1002 is provided along with a green-blue condition 1004 rendered from it. Also provided is a rules texture 1008, and a subsequent generation 1010 that is produced by way of the present process.

As shown, (A) denotes initial cell values, (B) denotes a green component of the condition value which is each cell number of active neighbors, (C) is a blue component of the condition value which reflects whether the cell is on or off, (D) denotes an 8×2 pixel texture which encodes the rule map, and (E) denotes the resulting generation of cell values which may be used again as input (A).

In particular, (A) is the starting point for one iteration of the current simulation. In the present example, one iteration of the simulation generates a single new cell value (E) which may be fed back in as new input (A). This creation of (E) from (A) may be referred to as calculating one new generation of the cell value.

In the context of the present example, the cell value may exist as a texture in video memory of the hardware graphics pipeline. Each cell value is either "on" or "off". Cell values which are "on" are stored as white texels. Cell values which are "off" are stored as black texels.

The cellular automata program proceeds by applying a set of rules to each texel of the input. The result of applying the rules is a new state (on or off) for that texel. In a more general scheme, texels can have many more states than "on" or "off" and these would be represented by a spectrum of colors instead of binary white and black.

Next, a condition texture value (B), (C) is rendered from the input (A). The condition texture value (B), (C) is shown here separated into a green color channel and a blue color channel for clarity. This condition texture value encodes the current state of each texel relative to a plurality of rule map values (D). In this case, the rule map values depend on the number of "on" cells surrounding each texel and also whether that texel is "on" or "off". Thus, the green channel holds, at each texel, a color value which represents the number of neighbor cells which are "on" surrounding that texel. Neighbor sampling may be used to count the number of "on" neighbors and render this into the green channel of the condition texture. More information relating to such neighbor sampling may be found with reference to a co-pending patent application Ser. No. 10/099,770 entitled "System and Method for Creating A Vector Map in a Hardware Graphics Pipeline" which was filed concurrently herewith under application No. 10,099,770, and naming inventors Gregory Edward James and Matthias Wloka, and which is incorporated herein by reference in its entirety. The blue channel of the condition texture holds a value of 1 or 0 depending on whether the texel is "on" or "off" in (A).

Once the condition texture value is created, it is used as the source texture for a dependent texture read operation (i.e. dependent texture addressing operation). In this operation, the color of the condition texture value determines the texture coordinate at which to fetch a color from a separate texture (D) in the form of a rule map. This rule map includes a look-up table. The condition texture value determines the address at which to read from the look-up table. The result of the look up is a new cell value, either "on" or "off" in the next generation.

The present cellular automata formulation depends on the source texels being white and the intermediate being green-blue. One could easily perform an additional dependent texture read from the source or intermediate into an arbitrary color ramp to create a separate texture for use in rendering the scene. Also, there is no need to limit the rule map to 8×2 pixels. Any size texture could be loaded, and this texture could encode highly complex rules, or rules which spawn pixels of any RGB value. The technique of supplying the rules map via a texture allows the rules to change independent of the rendering configuration and commands sent to the hardware graphics pipeline. By changing only the bound rules texture map, an entirely different cellular automata may be run in the hardware graphics pipeline. Additionally, the rules map may modify itself by the techniques taught in the aforementioned co-pending patent application.

While various embodiments have been described above, it should be understood that they have been presented by way of example only, and not limitation. Thus, the breadth and scope of a preferred embodiment should not be limited by any of the above described exemplary embodiments, but should be defined only in accordance with the following claims and their equivalents. The order of elements within claims does not indicate any particular order of steps or operations.

What is claimed is:

1. A method for executing a cellular automata program in a hardware graphics pipeline, comprising:
   receiving cell values in the hardware graphics pipeline;
   rendering the cell values to generate a condition value utilizing the hardware graphics pipeline;
   reading a rule map according to the condition value utilizing the hardware graphics pipeline; and
   storing additional cell values based on the rule map.

2. The method as set forth in claim 1, wherein the cell values are referenced by geometry.

3. The method as set forth in claim 2, wherein the geometry is bound to the rule map.

4. The method as set forth in claim 2, wherein the geometry is bound to information indicating how to access a plurality of the cell values as a texture lookup.

5. The method as set forth in claim 1, wherein the cell values are referenced as an array of textures.

6. The method as set forth in claim 1, wherein the condition value is represented by a color value.

7. The method as set forth in claim 1, and further comprising combining a plurality of the cell values, and rendering the combined cell values to generate the condition value.

8. The method as set forth in claim 7, wherein at least one of the combined cell values includes a cell value from a previous iteration of the receiving, rendering, and reading.

9. The method as set forth in claim 1, and further comprising combining a plurality of the condition values, and reading the rule map according to the combined condition values.

10. The method as set forth in claim 1, wherein the rule map is 1-dimensional.

11. The method as set forth in claim 1, wherein the rule map is 2-dimensional.

12. The method as set forth in claim 1, wherein the rule map is 3-dimensional.

13. The method as set forth in claim 1, wherein the rule map is 4-dimensional.

14. The method as set forth in claim 1, wherein the rule map is a look-up table.

15. The method as set forth in claim 1, wherein the rule map is read utilizing the condition value as an index into the rule map.

16. The method as set forth in claim 1, wherein a plurality of rule map values are read from a plurality of rule maps.

17. The method as set forth in claim 16, and further comprising combining the rule map values.

18. The method as set forth in claim 16, and further comprising storing the rule map values.

19. The method as set forth in claim 1, and further comprising repeating the receiving, rendering, and reading in multiple iterations.

20. The method as set forth in claim 19, and further comprising repeating the receiving, rendering, and reading in multiple iterations utilizing a result from a previous iteration.

21. The method as set forth in claim 19, wherein the receiving, rendering, and reading are programmably repeated.

22. The method as set forth in claim 1, wherein the rule map is programmably read.

23. The method as set forth in claim 1, wherein the receiving, rendering, and reading are executed in a multi-texture engine of the hardware graphics pipeline.

24. A system for executing a cellular automata program in a hardware graphics pipeline, comprising:
   means for receiving cell values in a hardware graphics pipeline;
   means for rendering the cell values to generate a condition value utilizing the hardware graphics pipeline;
   means for reading a rule map according to the condition value utilizing the hardware graphics pipeline; and
   means for storing additional cell values based on the rule map.

25. A system for executing a cellular automata program in a hardware graphics pipeline, comprising:
   logic for receiving cell values in the hardware graphics pipeline;
   logic for rendering the cell values to generate a condition value utilizing the hardware graphics pipeline;
   logic for reading a rule map according to the condition value utilizing the hardware graphics pipeline; and
   logic for storing additional cell values based on the rule map.

26. A method for executing a cellular automata program in a hardware graphics pipeline, comprising:
   inputting a rule map in a look-up table in the hardware graphics pipeline;
   inputting geometry that references cell values as an array of textures in the hardware graphics pipeline, the geometry being bound to the rule map and information indicating how to access a plurality of the cell values as a texture lookup;
   rendering the cell values to generate a condition value utilizing the hardware graphics pipeline, wherein the condition value is represented by a color value;

repeating the rendering to generate a plurality of the condition values;

combining the conditional values to generate a final condition value;

reading a rule map value from the rule map with the final condition value utilizing the hardware graphics pipeline, wherein the rule map value is read from the rule map utilizing the final condition value as an index into the rule map;

programmably repeating the inputting, rendering, repeating, combining, and reading;

combining the rule map values;

programmably repeating the inputting, rendering, repeating, combining, and reading utilizing the combined rule map values; and storing additional cell values based on the rule map values.

* * * * *

UNITED STATES PATENT AND TRADEMARK OFFICE
CERTIFICATE OF CORRECTION

| | | |
|---|---|---|
| PATENT NO. | : 6,760,032 B1 | Page 1 of 1 |
| APPLICATION NO. | : 10/098833 | |
| DATED | : July 6, 2004 | |
| INVENTOR(S) | : James | |

It is certified that error appears in the above-identified patent and that said Letters Patent is hereby corrected as shown below:

Col. 10, line 28, replace "arc" with --are--.

Signed and Sealed this

Sixth Day of September, 2011

David J. Kappos
*Director of the United States Patent and Trademark Office*